Dec. 15, 1964 M. I. ENSLEY 3,160,969

WATER SPRAYING APPARATUS FOR A HAND IRON

Filed Sept. 17, 1962 3 Sheets-Sheet 1

INVENTOR
MAURICE I. ENSLEY

BY~Maybee & Legris
ATTORNEYS

WATER SPRAYING APPARATUS FOR A HAND IRON

Filed Sept. 17, 1962 3 Sheets-Sheet 2

INVENTOR
MAURICE I. ENSLEY

BY Maybee & Legris
ATTORNEYS

Dec. 15, 1964 M. I. ENSLEY 3,160,969
WATER SPRAYING APPARATUS FOR A HAND IRON
Filed Sept. 17, 1962 3 Sheets-Sheet 3
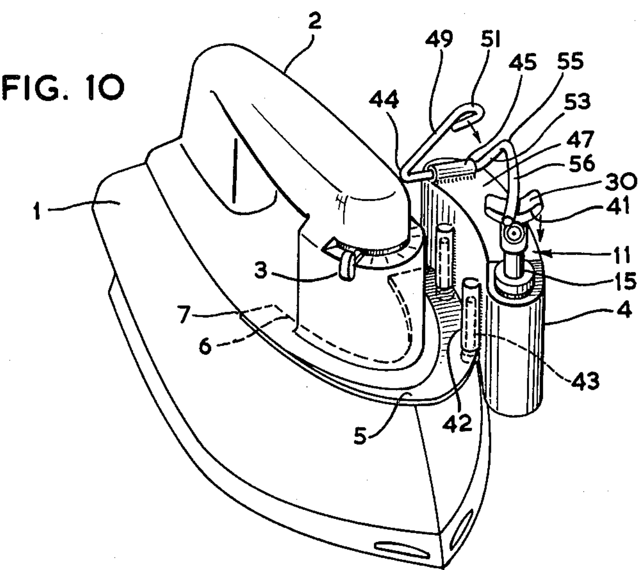
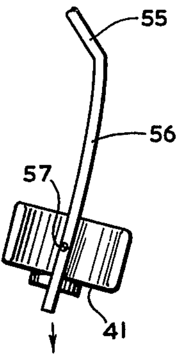
FIG. 11
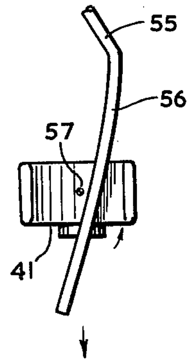
FIG. 12
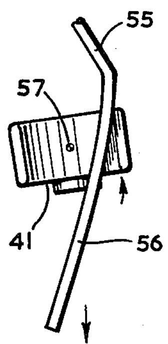
FIG. 13
INVENTOR
MAURICE I. ENSLEY
BY Maybee & Legris
ATTORNEYS United States Patent Office 3,160,969 Patented Dec. 15, 1964

1

3,160,969
WATER SPRAYING APPARATUS FOR A HAND IRON
Maurice I. Ensley, 26 Queen St. E., Toronto 1, Ontario, Canada
Filed Sept. 17, 1962, Ser. No. 223,971
20 Claims. (Cl. 38—78)

This invention relates to water spraying apparatus for a hand iron.

There are several steam irons on the market which may be operated to direct a spray of water in advance of the iron to moisten the article being ironed. Steam generated within the iron is usually employed to provide pressure for the spray. However the use, for a spray, of the water which is also used to generate steam in the iron makes it necessary to refill the iron frequently, and with many spray irons difficulty has been experienced with clogging when distilled water is not used. Some spraying devices also have the disadvantage that they direct their spray to too small an area ahead of the iron.

According to the present invention there is provided a spraying apparatus which has its own water reservoir and spray device. The apparatus may be used on steam or dry irons, it may be attached to the iron in such a way that it does not interfere with ordinary use of the iron, it may be easily filled and operated, it provides an effective spray over a sufficiently large area, and it may be inexpensively made.

Two embodiments of the invention are illustrated by way of example in the accompanying drawings in which:

FIG. 10 is a perspective view of another embodiment of the invention; and

FIGS. 11, 12 and 13 are top views of the plunger and part of the operating arm of the spray attachment of FIG. 10 with the operating arm moved progressively forwardly.

Figure 1:
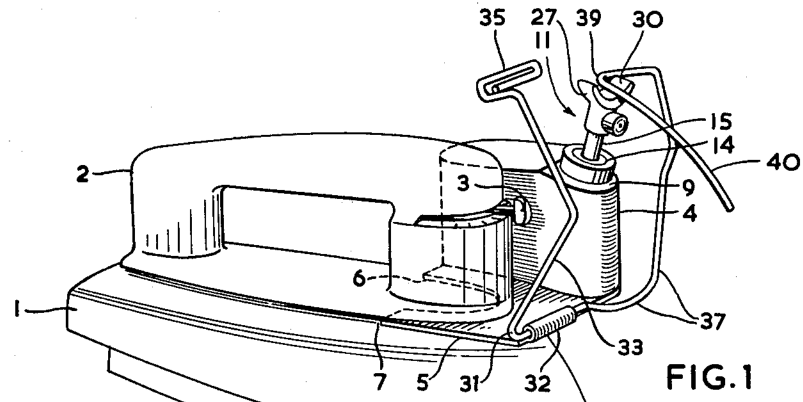
FIG. 1 is a perspective view of a hand iron with a spray attachment in place and ready for use.
Figure 2:
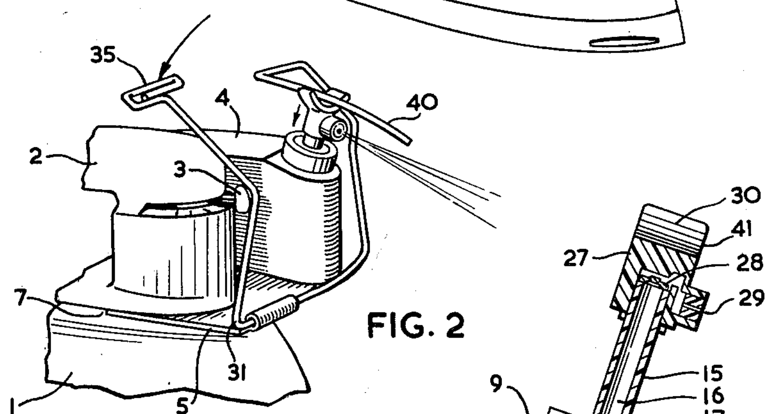
FIG. 2 is a perspective view of the spray attachment of FIG. 1 being actuated to spray water ahead of the iron.

FIGS. 1 and 2 show a hand iron having a metal body 1 and a handle 2 of heat insulative material. At the front of the handle is a heat control lever 3. Other parts of the iron may also conventionally be located at the front of the iron: for a steam iron, for example, a filling opening may be located below the lever 3 and a steam shutoff button above it. Since the operator requires access to the lever 3 and to the parts that may be provided at the front of the iron, the spray attachment, now to be described, has been arranged so that it does not obstruct parts to which such access is required. The spray attachment has a rigid metal reservoir 4 supported by a rigid mounting plate member 5 having a thin rear edge 6. The edge 6 is of such thinness that it can be pressed into a clearance space 7 which is normally to be found between the body 1 and handle 2 of the iron to minimize heat transfer to the handle. The reservoir 4 is mounted along one side of the member 5 so that it is supported at the front of and to one side of but clear of the iron. To ensure firm support for the reservoir, the thin edge 6 of the member 5 is preferably concave in shape curving inwardly of the member 5, so that the edge 6 is inserted between and gripped by the body 1 and handle 2 at the front of and at both sides of the handle. The curvature of the edge 6 also enables the position of the member 5 to be adjusted somewhat in the horizontal plane relative to the iron, thus allowing the reservoir 4 to be rotated to some extent relative to the front of the handle of the iron to obtain the most satisfactory position for a given iron. In all its positions the reservoir, being held clear of and mainly to the side of the iron, allows unobstructed access to the heat control lever 3 and to other devices with which the iron may be equipped. Thus the same spray attachment may be mounted on irons of various constructions.

Figure 3:
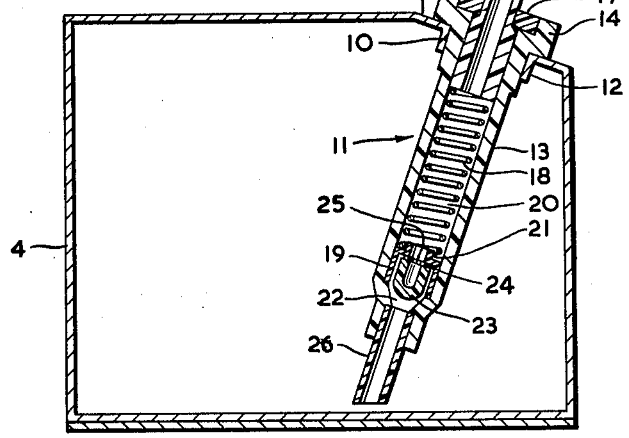
FIG. 3 is a longitudinal sectional view through the reservoir and the pumping and spraying device of the spray attachment of FIG. 1.
Figure 4:
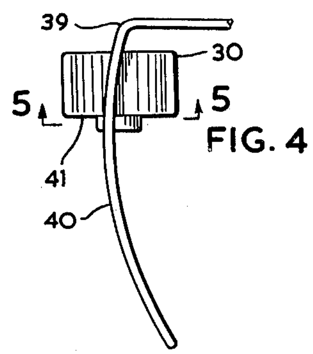
FIG. 4 is a top view of the plunger and part of the operating arm of the spray attachment of FIG. 1, drawn slightly rearwardly from the normal position of FIG. 1.
Figure 5:
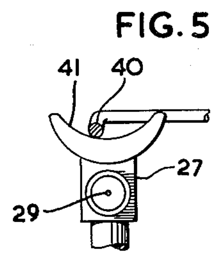
FIG. 5 is a front view taken on the line 5—5 of FIG. 4.
Figure 6:
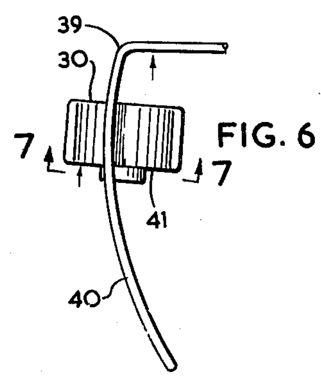
FIG. 6 is a view similar to FIG. 4 but with the operating arm drawn farther rearwardly.
Figure 7:
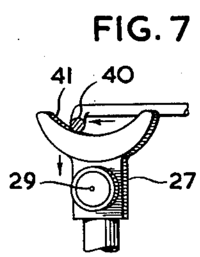
FIG. 7 is a view taken on the line 7—7 of FIG. 6.
Figure 8:
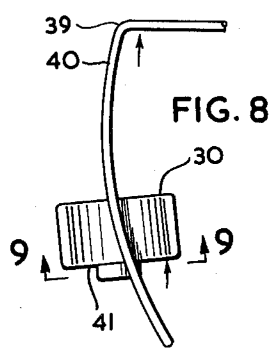
FIG. 8 is a view similar to FIGS. 4 and 6 with the operating arm drawn still farther rearwardly.
Figure 9:
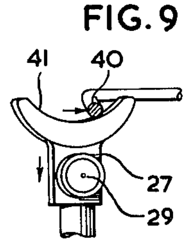
FIG. 9 is a view taken on the line 9—9 of FIG. 8.

The top of the reservoir slopes downward slightly at the front thereof, and in this sloping portion 9 is a filling hole 10 in which is removably mounted a pumping and spraying device generally indicated by reference numeral 11. The filling hole 10 is provided around its perimeter with an inwardly projecting flange 12 which helps to position the pumping and spraying device 11 in the filling hole. The pumping and spraying device is of a conventional, inexpensive type, preferably of the kind illustrated in the Andrew M. Martin U.S. Patent 2,362,080 or 2,362,081, both dated November 7, 1944. The construction is shown somewhat schematically in FIG. 3. The device 11 includes a barrel 13 that seats snugly into the filling hole 10, the barrel having a flange 14 that engages the sloping portion 9 of the reservoir. Coaxial with the barrel and slidable downwardly and upwardly therein is an elongated plunger 15. The plunger 15 is rotatable about its longitudinal axis in the barrel and has an interior cylindrical passage 16. The plunger 15 is urged upwardly in the barrel 13 towards an upper stop 17 by a helical spring 18 compressed in the barrel, the lower end of the spring bearing against a lower stop 19. The space between the stops 17 and 19 constitutes a pump chamber 20. The spring 18 seats around a tubular neck 21 of the stop 19. Between this stop and a valve seat 22 in the barrel 13 is a valve plug 23 which in its upper position as shown in FIG. 3 rests against lugs 24 extending downwardly from the stop 19, the lugs 24 having passageways 25 between them so that water may flow from the reservoir upwardly through the lower end 26 of the barrel, around the valve plug 23 and through the passageways 25 and the neck 21 into the chamber 20. If the valve plug 23 rests on the seat 22 it prevents flow of water between the chamber 20 and the reservoir.

At its top the plunger 15 has a head 27 in which a check valve 28 normally obstructs the upper end of the passage 16 through the plunger. However the valve 28 is free to rise from its obstructing position to allow water to flow from the passage 16 to a spray outlet 29. The head 27 has a smooth concave upper surface 30.

As shown in FIGS. 1 and 2, at the front of the member 5 a rigid plunger operating arm 31 is mounted on a transverse pivotal axis, the pivotal mounting 32 consisting of a tongue of metal projecting from the front of member 5 and rolled around the arm 31. The arm 31 has, on the side of the pivotal mounting 32 remote from the reservoir 4, a lever portion 33 extending upwardly to a finger piece 35. On the reservoir side of the pivotal mounting 32 the arm has another portion 37 extending across the front of the reservoir 4 below the spray outlet 29 and clear of the reservoir and thence extending upwardly and rearwardly of the plunger 15 to an elbow 39 whence a plunger engaging portion 40 extends forwardly and downwardly across and in contact with the forward edge 41 of the plunger surface 30. The uppermost position which the plunger 15 can occupy when engaged with the operating arm 31 is that shown in FIG. 1, where the top of the plunger is nested in the elbow 39 of the arm. Note that the outer end of head 27 extends upwardly and nests in the angle of the elbow 39 to thus prevent furthuer forward movement of arm 31 by engaging the portion of the arm extending laterally from elbow 39. In this, its normal positon, the plunger is slightly depressed with respect to the position of FIG. 3, so that the arm 31 exerts a downward force on the plunger 15 and, through the spring 18, on the barrel 21, thus helping to hold the device 11 in the opening 10. Conversely, the spring 18 exerts an upward force on the plunger to hold the arm 31 in its FIG. 1 position.

To fill the reservoir the operator manually depresses the plunger 15 against the pressure of the spring 18 and thus disengages the head of the plunger from the elbow 39. While plunger 15 is thus held depressed the plunger operating arm 31 is free to be swung forwardly and downwardly to a position out of the way of the device 11 which can then be removed from the filling hole 10 to fill reservoir 4 with tap water. If desired the entire spray attachment may be pulled forwardly free of the iron by pulling the member 5 out of the space 7. When the reservoir has been filled, the pumping and spraying device 11 is replaced in the filling hole 10, the plunger 15 is depressed, and the portion 40 of the arm 31 is swung over the plunger so that as the plunger rises it again nests in the elbow 39. The rising plunger draws water from the reservoir past the valve plug 23 and into the chamber 20.

To spray water ahead of the iron the operator presses rearwardly and downwardly on the finger piece 35 as shown in FIGURE 2. The arm 31 pivots rearwardly and draws the plunger engaging portion 40 rearwardly across the forward edge 41 of the plunger, and since the portion 40 extends downwardly from the elbow 39 it depresses the plunger. Downward movement of the plunger forces the valve plug 23 to seat on the valve seat 22 so that water from the chamber 20 is forced upwardly through the passage 16, past the valve 28 and out the spray outlet 29.

As shown in FIGURES 4 to 9, as the plunger engaging portion 40 is drawn rearwardly it not only depresses the plunger but it also forces it to oscillate about the longitudinal axis of the plunger. From the position of FIGURES 4 and 5 to that of FIGURES 6 and 7 the portion 40 moves to the left along the edge 41 of the plunger to a point more distant from the longitudinal axis of the plunger, thus exerting a moment about the axis causing the plunger to rotate clockwise when viewed from above. Similarly, from the position of FIGURES 6 and 7 to that of FIGURES 8 and 9 the portion 40 moves to the right along the edge 41, thus rotating the plunger counter-clockwise. In the result, the plunger as it descends shoots its spray a decreasing distance in front of the iron and also shoots its spray from side to side as it oscillates about its longitudinal axis, thus dampening a substantial area ahead of the iron. When the operator releases the downward pressure on the finger piece 35, the pressure of the spring 18 forces the plunger 15 upwardly, and the upward pressure of the plunger on the arm portion 40 forces the arm 31 to swing forwardly again to the position of FIGURE 1. At the same time a fresh supply of water is drawn from the reservoir into the chamber 20.

It will be seen that although the plunger is rotatable about its longitudinal axis the direction in which the spray outlet 29 is aimed is determined by the configuration of the plunger engaging portion 40 as long as the latter engages the edge 41. The concavity of the surface 30 also contributes to the proper aiming of the spray outlet. To prevent the portion 40 from being drawn so far rearwardly that it disengages the edge 41, rearward movement of the arm 31 is limited by engagement of the arm portion 37 with the reservoir 4.

Another embodiment of the invention is shown in FIGURE 10. In this embodiment the reservoir 4 is removably secured to the member 5 by means of vertical sockets 42 at one side of the reservoir and slipped onto vertical posts 43 on the member 5. The reservoir can thus be easily removed from the iron for filling. The reservoir has a pumping and spraying device 11 which can be of the same construction as that of FIGURES 1 to 9, but the means for operating it are somewhat different. At the rear of the reservoir 4 a plunger operating arm 44 has a pivoted mounting 45 with a transverse pivotal axis. At the side of the pivotal mounting 45 adjacent the handle 2, the arm 44 has a lever portion 49 extending upwardly and forwardly to a finger piece 51. At the side of the pivotal mounting 45 remote from the handle 2, the arm 44 has another portion 53 extending upwardly and forwardly to an elbow 55 whence a plunger engaging portion 56 extends forwardly and downwardly across and in contact with the forward edge 41 of the upper surface of the plunger 15. FIGURE 10 shows the plunger 15 in its normal, uppermost position. The weight of the arm 44 on the plunger 15 helps to hold the device 11 in the reservoir.

To fill the reservoir when the plunger operating arm is arranged as shown in FIGURE 10, the operator swings the plunger operating arm 44 rearwardly to a position out of the way of the device 11 which can then be removed from the reservoir to fill it with tap water. When the reservoir has been filled, the pumping and spraying device 11 is replaced in the filling hole 10, and the arm 44 is swung forwardly to bring the portion 56 into engagement with the edge 41 of the plunger 15.

To spray water ahead of the iron, the operator presses forwardly and downwardly on the finger piece 51. The arm 44 pivots forwardly and forces the plunger engaging portion 56 forwardly across the forward edge 41 of the plunger. Since the portion 56 extends downwardly from the elbow 55 it depresses the plunger, forcing water out the spray outlet 29.

FIGURES 11, 12 and 13 illustrates the way in which the plunger is forced to oscillate about its longitudinal axis in the arrangement of FIGURE 10. The portion 56 extends downwardly from elbow 55 so that the portion 56 engages only the forward edge 41 of the plunger. Because the spring 18 of the device 11 urges the plunger upwardly against portion 56 and because of the concave-upwardly shape of the edge 41, the plunger tends to orient itself so that the lowest point on the edge 41 is in contact with the portion 56. As seen in the sequential FIGURES 11, 12 and 13, the curvature of the portion 56 is such that, as the portion 56 moves forwardly and depresses the plunger from its uppermost position of FIGURE 11 to its lowermost position of FIGURE 13, the point of engagement between the edge 41 and the portion 56 remains in the vicinity of the lowest point of the edge 41 but shifts from left to right with respect to the longitudinal axis 57 of the plunger. Thus, the plunger head, as it descends, rotates counter-clockwise.

As in the arrangement of FIGURE 1, this action has the result that the plunger is reciprocated along its longitudinal axis 57, which is normal to the direction of spray, and the plunger is simultaneously oscillated about its axis. The plunger is forwardly inclined and as it descends it shoots its spray a decreasing distance in front of the iron and it also shoots its spray from side to side as it oscillates. When the operator releases the downward pressure on the finger piece 51, the pressure of the spring 18 forces the plunger 15 upwardly, swinging the arm 44 backwardly to the position of FIGURE 10, and drawing a fresh supply of water from the reservoir into the chamber 20.

The member 5 of FIGURE 10 may if desired be permanently affixed to the iron, for example by the means which secure the handle 2 to the body 1.

What I claim as my invention is:

1. Water spraying apparatus for a hand iron, comprising a water reservoir, a pumping and spraying device mounted in the reservoir at the top and front of the reservoir and comprising a plunger having a spray outlet above the reservoir, the plunger being slidable axially downwardly and upwardly in the reservoir between an upper and a lower position to pump water from the reservoir to the spray outlet, means for securing the reservoir at one side of the front of an iron with the spray outlet adapted to be aimed ahead of the iron, manually operable means movably carried by said apparatus and having a portion engaging said plunger and being movable relative thereto for sliding the plunger downwardly and upwardly along its longitudinal axis in response to movement of said manually operable means, said manually operable means including means to oscillate the plunger about its longitudinal axis as it slides, to direct the spray from side to side ahead of the iron.

2. Apparatus as claimed in claim 1, wherein the securing means comprise a rigid reservoir mounting member having a thin edge adapted to be pressed between the body and handle of an iron to support the reservoir at the front of and to one side of the iron.

3. Apparatus as claimed in claim 2, wherein the thin edge curves inwardly of the mounting member so as to be gripped between the body and handle of the iron at the front and at both sides of the handle and permit some adjustment of the position of the attachment relative to the iron.

4. Apparatus as claimed in claim 2, wherein vertical posts and sockets are provided for removably securing the mounting member and the reservoir together, with said posts fitting into said sockets.

5. Apparatus as claimed in claim 1, including resilient means normally holding the plunger in its upper position.

6. Apparatus as claimed in claim 5, wherein said plunger sliding means includes a plunger operating arm mounted movably relative to the reservoir, the arm engaging the plunger and being movable manually between a first position and a second position to slide the plunger downwardly from its upper to its lower position, the arm being returnable to the first position by the plunger under the force of the resilient means.

7. Water spraying apparatus for a hand iron, comprising a water reservoir having a filling opening located at the top and front of the reservoir, a pumping and spraying device removably mounted in the filling opening, the pumping and spraying device comprising a plunger having a forwardly facing spray outlet, the plunger being slidable downwardly and upwardly in the filling opening between an upper and a lower position to pump water from the reservoir to the spray outlet, resilient means normally holding the plunger in its upper position, means for securing the reservoir at one side of the front of an iron with the spray outlet adapted to be aimed ahead of the iron, manually operable means pivotally mounted on said apparatus and having a portion slidably engaging said plunger and being movable relative thereto for sliding the plunger downwardly and upwardly along its longitudinal axis in response to pivotal movement of said manually operable means, said manually operable means including means to oscillate said plunger about its longitudinal axis as it slides, to direct the spray from side to side ahead of the iron.

8. Water spraying apparatus for a hand iron, comprising a water reservoir having a filling opening located at the top and front of the reservoir, a pumping and spraying device removably mounted in the filling opening, the pumping and spraying device comprising a barrel fitting into the filling opening, a plunger having a forwardly facing spray outlet, the plunger being slidable axially downwardly and upwardly in the barrel between an upper and a lower position to pump water into the barrel and thence to the spray outlet, a spring in compression between the barrel and the plunger and urging the plunger upwardly, a plunger operating arm mounted movably relative to the reservoir, the arm engaging the plunger and being movable manually between a first position and a second position to slide the plunger downwardly from its upper to its lower position, the arm having means for oscillating the plunger about its axis as the plunger slides to direct spray from side to side ahead of the iron, the arm being returnable to the first position by the plunger under the force of the spring, and the arm in the first position holding said plunger slightly below its upper position against the upward urging of the spring, thus causing the spring to exert a downward force on the barrel to press the barrel into the filling opening.

9. Water spraying apparatus for a hand iron, comprising a water reservoir having a filling opening located at the top and front of the reservoir, a pumping and spraying device removably mounted in the filling opening, the pumping and spraying device comprising an elongated plunger having a forwardly facing spray outlet, the plunger being slidable downwardly and upwardly in the filling opening between an upper and a lower position to pump water from the reservoir to the spray outlet, the plunger also being oscillatable in the filling opening about the longitudinal axis of the plunger, a plunger operating arm mounted movably relative to the reservoir and movable between a first position and a second position, the arm and plunger having means engaging each other whereby when the arm is moved manually from its first to its second position the plunger slides from its upper to its lower position, the pumping and spraying device having a spring urging the plunger upwardly against manual movement of the arm to restore the plunger to its upper position and the arm to its first position, the engaging means of the arm and plunger including means for oscillating the plunger as it slides to direct the forward spray from the spray outlet from side to side.

10. Apparatus as claimed in claim 9, including a rigid reservoir mounting member having a thin edge adapted to be pressed between the body and handle of an iron to support the reservoir at the front of and to one side of the iron, the reservoir, pumping and spraying device and operating arm being so located as not to obstruct parts of the iron to which an operator requires access.

11. Apparatus as claimed in claim 10, wherein the operating arm is mounted on the mounting member.

12. Apparatus as claimed in claim 10, wherein the operating arm is mounted on the reservoir.

13. Apparatus as claimed in claim 10, wherein the plunger operating arm is movable to another position where it is disengaged from the plunger so that the pumping and spraying device may be removed from the filling opening to enable the reservoir to be filled.

14. Apparatus as claimed in claim 13, wherein with the operating arm disengaged the plunger is freely rotatable about its longitudinal axis but wherein the engaging means of the arm and plunger when engaged aim the spray outlet forwardly.

15. Apparatus as claimed in claim 14, wherein the engaging means of the arm and plunger comprise a smooth edge of the plunger having points at different distances from the longitudinal axis of the plunger, and an elongated arm portion that is drawn across and presses against the edge and moves along the edge as the arm is moved thus oscillating the plunger.

16. Water spraying apparatus for a hand iron, comprising a rigid water reservoir, a rigid reservoir mounting member having a thin rear edge curving inwardly of the mounting member and adapted to be pressed between the body and handle of the iron at the front of the iron, the reservoir being located at one side of the mounting member whereby it is supported at one side of the front of the iron where it does not obstruct parts of the iron to which an operator requires access, the reservoir having a filling opening located at the top and front of the reservoir, a pumping and spraying device removably mounted in the filling opening, the pumping and spraying device comprising an elongated plunger having a top concave surface with a smooth forward edge having points at different distances from the longitudinal axis of the plunger, the plunger having a forwardly facing spray opening below the forward edge for spraying water from the reservoir in front of the iron, the plunger being slidable downwardly and upwardly in the filling opening between an upper and a lower position to pump water from the reservoir to the spray outlet, a rigid plunger operating arm pivotally mounted on a transverse pivotal axis, the arm having a lever portion extending upwardly from the pivotal mounting to be adjacent the handle of the iron, the arm also having a plunger engaging portion extending forwardly and downwardly across and in contact with said forward edge of the plunger, the pumping and spraying device having a spring normally holding the plunger in its upper position, the lever portion of the arm being manually pivotable downwardly about its pivotal mounting thus drawing the plunger engaging portion across said forward edge of the plunger and pressing the plunger downwardly against the force of the spring to slide the plunger to its lower position, means mounting the plunger in the filling opening so as to be oscillatable therein about the longitudinal axis of the plunger, the plunger engaging portion being so configured that as it is drawn across the forward edge of the plunger its position of engagement with the plunger tends to move along the forward edge of the plunger thus oscillating the plunger to direct the forward spray from the spray outlet from side to side, said spring urging the plunger, and thereby the arm, to their initial positions when the lever portion of the arm is released, the arm being pivotally mounted for movement to a third position free of engagement with said plunger whereby the pumping and spraying device may be removed from the filling opening.

17. Water spraying apparatus for a hand iron, comprising a water reservoir, a pumping and spraying device including water spraying means with a forwardly facing spray outlet locatable near the front of the iron, the pumping and spraying device being operatable to pump water from the reservoir to the spray outlet to direct a spray of water ahead of the iron, the spray means being oscillatable about an axis at an angle to the direction of spray, and manually depressable lever means for operating the device and including means for simultaneously oscillating the spray means about said axis to direct the spray to different locations ahead of the iron.

18. Apparatus as claimed in claim 17, wherein the spray means are movable along said axis by the lever means.

19. Apparatus as claimed in claim 18, wherein said axis is an upright forwardly inclined axis normal to the direction of spray.

20. Apparatus as claimed in claim 19, wherein the pumping and spraying device comprises a plunger reciprocatable along said axis and extending into the reservoir.

References Cited in the file of this patent

UNITED STATES PATENTS

| | | |
|---|---|---|
| 1,580,499 | Kruttschnitt | Apr. 13, 1926 |
| 1,725,056 | Carlberg | Aug. 20, 1929 |
| 1,938,292 | Koppelman | Dec. 5, 1933 |
| 2,011,285 | Jackson et al. | Aug. 13, 1935 |
| 2,080,175 | Kuno | May 11, 1937 |
| 2,330,047 | Godsey | Sept. 21, 1943 |
| 2,362,081 | Martin | Nov. 7, 1944 |
| 2,787,501 | Tuma | Apr. 2, 1957 |

FOREIGN PATENTS

| | | |
|---|---|---|
| 318,782 | Switzerland | Jan. 31, 1957 |